(12) United States Patent
Wang et al.

(10) Patent No.: US 9,926,441 B2
(45) Date of Patent: Mar. 27, 2018

(54) POLYETHYLENE BLEND-COMPOSITION SUITABLE FOR BLOWN FILMS, AND FILMS MADE THEREFROM

(71) Applicant: Dow Global Technologies LLC, Midland, MI (US)

(72) Inventors: Jian Wang, Rosharon, TX (US); Nilesh R. Savargaonkar, Pearland, TX (US); Mehmet Demirors, Pearland, TX (US); John W. Garnett, IV, Omaha, NE (US)

(73) Assignee: Dow Global Technologies LLC, Midland, MI (US)

( * ) Notice: Subject to any disclaimer, the term of this patent is extended or adjusted under 35 U.S.C. 154(b) by 191 days.

(21) Appl. No.: 14/388,707

(22) PCT Filed: May 22, 2013

(86) PCT No.: PCT/US2013/042143
§ 371 (c)(1),
(2) Date: Sep. 26, 2014

(87) PCT Pub. No.: WO2014/003927
PCT Pub. Date: Jan. 3, 2014

(65) Prior Publication Data
US 2015/0299440 A1    Oct. 22, 2015

Related U.S. Application Data

(60) Provisional application No. 61/664,309, filed on Jun. 26, 2012.

(51) Int. Cl.
*C08F 210/16* (2006.01)
*C08L 23/06* (2006.01)
(Continued)

(52) U.S. Cl.
CPC .......... *C08L 23/06* (2013.01); *B29C 47/0026* (2013.01); *B29C 47/8825* (2013.01);
(Continued)

(58) Field of Classification Search
CPC ..... C08J 5/18; C08J 2323/08; C08L 23/0815; C08L 23/06; B32B 27/08
(Continued)

(56) References Cited

U.S. PATENT DOCUMENTS 4,543,399 A   9/1985   Jenkins, III et al.
4,621,952 A   11/1986  Aronson
(Continued)

FOREIGN PATENT DOCUMENTS

EP   0735090    2/1996
WO   99/55775   11/1999
(Continued)

OTHER PUBLICATIONS

J. B. P. Soares and A. E. Hamielec in 3(2) Polymer Reaction Engineering 131-200 (1995).
(Continued)

*Primary Examiner* — Ellen S Wood
(74) *Attorney, Agent, or Firm* — Brooks, Cameron & Huebsch, PLLC (57) ABSTRACT

The instant invention provides a polyethylene blend-composition suitable for blown films, and films made therefrom. The polyethylene blend-composition suitable for blown films according to the present invention comprises the melt blending product of: (a) from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of
(Continued)

a linear low density polyethylene composition has a density in the range of 0.900 to 0.935 g/cm³, a molecular weight distribution ($M_w/M_n$) in the range of 1.5 to 4.5, a melt index ($I_2$) in the range of 0.1 to 5 g/10 minutes, a molecular weight distribution ($M_z/M_w$) in the range of less than 3, vinyl unsaturation of less than 0.1 vinyls per one thousand carbon atoms present in the backbone of said composition, and a zero shear viscosity ratio (ZSVR) in the range from 1 to less than 2; (c) optionally a hydrotalcite based neutralizing agent; (d) optionally one or more nucleating agents; (e) and optionally one or more antioxidants.

12 Claims, 2 Drawing Sheets (51) Int. Cl.

| | | |
|---|---|---|
| B29C 47/00 | (2006.01) | |
| C08J 5/18 | (2006.01) | |
| C08L 23/08 | (2006.01) | |
| B29C 47/88 | (2006.01) | |
| B29C 47/92 | (2006.01) | |
| B32B 27/08 | (2006.01) | |
| B32B 27/20 | (2006.01) | |
| B32B 27/32 | (2006.01) | |
| B32B 1/02 | (2006.01) | |

(52) U.S. Cl.
CPC ............... *B29C 47/92* (2013.01); *B32B 1/02* (2013.01); *B32B 27/08* (2013.01); *B32B 27/20* (2013.01); *B32B 27/32* (2013.01); *C08J 5/18* (2013.01); *C08L 23/0815* (2013.01); *B29C 2947/92704* (2013.01); *B29C 2947/92714* (2013.01); *B32B 2250/242* (2013.01); *B32B 2270/00* (2013.01); *B32B 2307/4026* (2013.01); *B32B 2307/518* (2013.01); *B32B 2439/00* (2013.01); *C08J 2323/08* (2013.01); *C08J 2423/06* (2013.01); *C08L 2203/16* (2013.01); *C08L 2205/025* (2013.01); *C08L 2207/066* (2013.01); *C08L 2207/07* (2013.01)

(58) Field of Classification Search
USPC ................... 525/191, 240; 428/34.7, 35.1
See application file for complete search history.

(56) References Cited

U.S. PATENT DOCUMENTS

| | | | |
|---|---|---|---|
| 4,933,149 A | 6/1990 | Rhee et al. | |
| 5,405,922 A | 4/1995 | DeChellis et al. | |
| 5,462,999 A | 10/1995 | Griffin et al. | |
| 5,536,796 A | 7/1996 | Jejelowo et al. | |
| 6,130,293 A * | 10/2000 | Hitchcock | C08J 5/18 |
| | | | 525/191 |
| 6,242,545 B1 | 6/2001 | Jejelowo et al. | |
| 6,485,662 B1 | 11/2002 | Neubauer et al. | |
| 6,627,713 B2 | 9/2003 | Bernier et al. | |
| 7,078,467 B1 | 7/2006 | Kolb et al. | |
| 7,229,678 B2 * | 6/2007 | Reighard | B32B 27/08 |
| | | | 427/411 |
| 8,247,065 B2 | 8/2012 | Best et al. | |
| 8,481,666 B2 | 7/2013 | Michie et al. | |
| 2006/0047077 A1 | 3/2006 | Tas | |
| 2008/0038533 A1 | 2/2008 | Best et al. | |
| 2009/0192270 A1 | 7/2009 | Malakoff et al. | |
| 2010/0317804 A1 | 12/2010 | Karjala et al. | |
| 2011/0060075 A1* | 3/2011 | Oobayashi | C08L 23/10 |
| | | | 523/351 |
| 2012/0095158 A1 | 4/2012 | Patel et al. | |
| 2013/0164552 A1* | 6/2013 | Wang | C08J 5/18 |
| | | | 428/523 |

FOREIGN PATENT DOCUMENTS

| | | |
|---|---|---|
| WO | 0198409 | 12/2001 |
| WO | WO2009/114661 | 9/2009 |
| WO | WO2011/082045 | 7/2011 |

OTHER PUBLICATIONS

PCT/US2013/042143; International Search Report and Written Opinion of the International Searching Authority dated Jul. 19, 2013.
PCT/US2013/042143, International Preliminary Report on Patentability dated Jan. 8, 2015.
Chinese Office Action dated Feb. 25, 2016; from Chinese counterpart Application No. 201380042952.3.

* cited by examiner

POLYETHYLENE BLEND-COMPOSITION SUITABLE FOR BLOWN FILMS, AND FILMS MADE THEREFROM

REFERENCE TO RELATED APPLICATIONS

The present application claims the benefit of U.S. Provisional Application No. 61/664,309, filed on Jun. 26, 2012.

FIELD OF INVENTION

The instant invention relates to a polyethylene blend-composition suitable for blown films, and films made therefrom.

BACKGROUND OF THE INVENTION

The use of polymeric materials such as ethylene-based compositions in an extrusion blown film process is well-known. The extrusion blown film process employs an extruder which heats, melts, and conveys the molten polymeric material and forces it through an annular die. The ethylene-based film is drawn from the die and formed into a tubular shape and eventually passed through a pair of draw or nip rollers. Internal compressed air is then introduced from the mandrel causing the tube to increase in diameter forming a bubble of the desired size. Thus, the blown film is stretched in two directions, namely in the axial direction, i.e. by the use of forced air which expands the diameter of the bubble, and in the lengthwise direction of the bubble, i.e. by the action of a winding element which pulls the bubble through the machinery. External air is also introduced around the bubble circumference to cool the melt as it exits the die. The film width is varied by introducing more or less internal air into the bubble thus increasing or decreasing the bubble size. The film thickness is controlled primarily by increasing or decreasing the speed of the draw roll or nip roll to control the draw-down rate.

The bubble is then collapsed into two doubled layers of film immediately after passing through the draw or nip roll. The cooled film can then be processed further by cutting or sealing to produce a variety of consumer products.

Despite the research efforts in producing the polymeric materials suitable for blown films, there is still a need for a polyethylene blend composition suitable for blown film, providing improved output rates. Furthermore, there is still a need for a method of producing a polyethylene blend composition suitable for blown film, providing improved output rates.

SUMMARY OF THE INVENTION

The instant invention provides a polyethylene blend-composition suitable for blown films, and films made therefrom.

In one embodiment, the instant invention provides a polyethylene blend-composition suitable for blown films comprising the melt blending product of: (a) from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a linear low density polyethylene composition has a density in the range of 0.900 to 0.935 g/cm$^3$, a molecular weight distribution ($M_w/M_n$) in the range of 1.5 to 4.5, a melt index ($I_2$) in the range of 0.1 to 5 g/10 minutes, a molecular weight distribution ($M_z/M_w$) in the range of less than 3, vinyl unsaturation of less than 0.1 vinyls per one thousand carbon atoms present in the backbone of said composition, and a zero shear viscosity ratio (ZSVR) in the range from 1 to less than 2; (c) optionally a hydrotalcite based neutralizing agent; (d) optionally one or more nucleating agents; (e) and optionally one or more antioxidants.

In an alternative embodiment, the instant invention provides a blown film comprising the polyethylene blend-composition, as described above.

In an alternative embodiment, the instant invention further provides an article comprising one or more blown films comprising the polyethylene blend-composition, as described above.

In another alternative embodiment, the instant invention further provides a container device comprising: (a) one or more substrates; and (b) one or more layers comprising one or more blown films comprising the polyethylene blend-composition, as described above.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the output rate is improved at least 6 percent relative to a similar linear low density polyethylene.

In an alternative embodiment, the instant invention provides a polyethylene blend-composition suitable for blown films, a blown film, an article and/or a container device, in accordance with any of the preceding embodiments, except that the polyethylene blend-composition has a peak at 32.7 ppm measured via $^{13}$C NMR, indicating the presence of $C_3$ carbon of $C_5$ branch in the LDPE component.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the total haze is improved by at least 15 percent relative to a blown film consisting essentially of a linear low density polyethylene.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the gloss is improved by at least 10 percent relative to a blown film consisting essentially of a linear low density polyethylene.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention provides a polyethylene blend-composition suitable for blown film, and films made therefrom. The term "polyethylene blend-composition," as used herein, refers to a physical blend of at least a low density polyethylene and a linear low density polyethylene composition, as described herein.

The polyethylene blend-composition suitable for blown film according to the presence invention comprises the melt blending product of: (a) from 0.5 to 4 percent by weight of a low density polyethylene having a density in the range of from 0.915 to 0.935 g/cm$^3$, and a melt index (I$_2$) in the range of from greater than 0.8 to less than or equal to 5 g/10 minutes, and a molecular weight distribution (M$_w$/M$_n$) in the range of from 6 to 10; (b) 90 percent or greater by weight of a linear low density polyethylene composition has a density in the range of 0.900 to 0.935 g/cm$^3$, a molecular weight distribution (M$_w$/M$_n$) in the range of 1.5 to 4.5, a melt index (I$_2$) in the range of 0.1 to 5 g/10 minutes, a molecular weight distribution (M$_z$/M$_w$) in the range of less than 3, vinyl unsaturation of less than 0.1 vinyls per one thousand carbon atoms present in the backbone of said composition, and a zero shear viscosity ratio (ZSVR) in the range from 1 to less than 2; (c) optionally a hydrotalcite based neutralizing agent; (d) optionally one or more nucleating agents; (e) and optionally one or more antioxidants.

The polyethylene blend-composition has a density in the range of 0.903 to 0.950 g/cm$^3$. All individual values and subranges from 0.903 to 0.950 g/cm$^3$ are included herein and disclosed herein; for example, the density can be from a lower limit of 0.903, 0.905, 0.910, 0915 g/cm$^3$ to an upper limit of 0.925, 0.930, 0.940, 0.945, or 0.950 g/cm$^3$. For example, the polyethylene blend-composition may have a density in the range of from 0.917 to 0.925 g/cm$^3$; or in the alternative, from 0.918 to 0.922 g/cm$^3$; or in the alternative, from 0.919 to 0.922 g/cm$^3$.

The polyethylene blend-composition has a melt index (I$_2$) in the range of from 0.1 to 5 g/10 minutes. All individual values and subranges from 0.1 to 5 g/10 minutes are included herein and disclosed herein; for example, the melt index (I$_2$) can be from a lower limit of 0.1, 0.2, 0.5, or 0.8 g/10 minutes, to an upper limit of 1, 2, 3, 4, or 5 g/10 minutes. For example, the polyethylene blend composition may have a melt index (I$_2$) in the range of from 0.2 to 5 g/10 minutes; or in the alternative, from 0.2 to 3 g/10 minutes; or in the alternative, from 0.5 to 2 g/10 minutes.

The inventive polyethylene blend-compositions provide higher melt strength, better bubble stability and higher output rate as well as improved optical properties.

In one embodiment, the polyethylene blend-composition has a peak at 32.7 ppm measured via $^{13}$C NMR indicating the presence of the C$_3$ carbon of a C$_5$ or amyl branch in the LDPE component.

In another embodiment, when the polyethylene blend-composition is formed into a film via a blown film process, the total haze is improved by at least 15 percent, for example, at least 50 percent, or in the alternative, at least 100 percent, or in the alternative, at least 150 percent, or in the alternative, at least 200 percent, or in the alternative, at least 250 percent, or in the alternative, at least 300 percent, or in the alternative, at least 350 percent, or in the alternative, and/or up to 400 percent, relative to a blown film consisting essentially of a linear low density polyethylene.

In another embodiment, when the polyethylene blend composition is formed into a film via a blown film process, the gloss is improved by at least 10 percent, for example, at least 50 percent, or in the alternative, at least 100 percent, or in the alternative, at least 150 percent, or in the alternative, at least 200 percent, or in the alternative, at least 250 percent, or in the alternative, at least 300 percent, or in the alternative, at least 350 percent, or in the alternative, and/or up to 400 percent, relative to a blown film consisting essentially of a linear low density polyethylene.

In another embodiment, when said polyethylene blend-composition is formed into a film via blown film process, the output rate is improved at least 6 percent, for example from 6 to 10 percent, relative to a similar linear low density polyethylene.

Low Density Polyethylene (LDPE) Component

The polyethylene blend composition suitable for blown film according to the present invention comprises less than or equal to 4 percent by weight of a low density polyethylene (LDPE); for example, from 0.5 to 4 weight percent; or in the alternative, from 0.5 to 3 weight percent; or in the alternative, from 1 to 3.5 weight percent. The low density polyethylene has a density in the range of from 0.915 to 0.935 g/cm$^3$; for example, from 0.915 to 0.925 g/cm$^3$; or in the alternative, from 0.918 to 0.922 g/cm$^3$. The low density polyethylene has a melt index (I$_2$) in the range of from greater than 0.8 to less than or equal to 5 g/10 minutes; for example, from 1 to 3 g/10 minutes; or in the alternative, from 1.5 to 2.5 g/10 minutes. The low density polyethylene has a molecular weight distribution (M$_w$/M$_n$) in the range of from 6 to 10; for example, from 6 to 9.5; or in the alternative, from 6 to 9; or in the alternative, from 6 to 8.5; or in the alternative, from 7.5 to 9. Such low density polyethylene compositions are commercially available, for example, from The Dow Chemical Company.

LDPE has a long chain branching of at least 2 per 1000 carbon and/or up to 4 per 1000 carbon.

Linear Low Density Polyethylene Composition Component

The linear low density polyethylene composition is substantially free of any long chain branching, and preferably, the linear low density polyethylene composition is free of any long chain branching. Substantially free of any long chain branching, as used herein, refers to a linear low density polyethylene composition preferably substituted with less than about 0.1 long chain branching per 1000 total carbons, and more preferably, less than about 0.01 long chain branching per 1000 total carbons.

The term (co)polymerization, as used herein, refers to the polymerization of ethylene and optionally one or more comonomers, e.g. one or more α-olefin comonomers. Thus, the term (co)polymerization refers to both polymerization of ethylene and copolymerization of ethylene and one or more comonomers, e.g. one or more α-olefin comonomers.

The polyethylene blend composition suitable for blown film according to the present invention comprises 90 percent or greater by weight of the linear low density polyethylene (LLDPE); for example, from 96 to 99.5 weight percent; or in the alternative, from 97 to 99.5 weight percent; or in the alternative, from 96.5 to 99 weight percent. The LLDPE comprises (a) less than or equal to 100 percent, for example, at least 65 percent, at least 70 percent, or at least 80 percent, or at least 90 percent, by weight of the units derived from ethylene; and (b) less than 35 percent, for example, less than 25 percent, or less than 20 percent, by weight of units derived from one or more α-olefin comonomers.

The linear low density polyethylene composition according to instant invention has a density in the range of from 0.900 to 0.935. All individual values and subranges from 0.900 to 0.935 g/cm$^3$ are included herein and disclosed herein; for example, the density can be from a lower limit of 0.0900, 0.903, 0.905, 0.908, 0.910, or 0.912 g/cm$^3$ to an upper limit of 0.920, 0.925, or 0.935 g/cm$^3$.

The linear low density polyethylene composition according to instant invention is characterized by having a zero shear viscosity ratio (ZSVR) in the range from 1 to less than 2, for example, from 1 to 1.9, or from 1 to 1.7, or from 1 to 1.5.

The linear low density polyethylene composition according to the instant invention has a molecular weight distribution ($M_w/M_n$) (measured according to the conventional gel permeation chromatography (GPC) method) in the range of 1.5 to 4.5. All individual values and subranges from 1.5 to 4.5 are included herein and disclosed herein; for example, the molecular weight distribution ($M_w/M_n$) can be from a lower limit of 1.5, 1.7, 1.8, 1.9, 2.1, 2.3, 2.5, 2.7, 2.9, 3.0 to an upper limit of 3.6, 3.8, 3.9, 4.2, 4.4, or 4.5.

The linear low density polyethylene composition according to the instant invention has a melt index ($I_2$) in the range of from of 0.1 to 5 g/10 minutes. All individual values and subranges from 0.1 to 5 g/10 minutes are included herein and disclosed herein; for example, the melt index ($I_2$) can be from a lower limit of 0.1, 0.2, 0.5, or 0.8 g/10 minutes to an upper limit of 1.2, 1.5, 1.8, 2.0, 2.2, 2.5, 3.0, 4.0, 4.5 or 5.0 g/10 minutes.

The linear low density polyethylene composition according to the instant invention has a molecular weight ($M_w$) in the range of 50,000 to 250,000 daltons. All individual values and subranges from 50,000 to 250,000 daltons are included herein and disclosed herein; for example, the molecular weight ($M_w$) can be from a lower limit of 50,000, 60,000, 70,000 daltons to an upper limit of 150,000, 180,000, 200,000 or 250,000 daltons.

The linear low density polyethylene composition may have molecular weight distribution ($M_z/M_w$) (measured according to the conventional GPC method) in the range of less than 5. All individual values and subranges from less than 5 are included herein and disclosed herein; for example, the linear low density polyethylene composition may have a molecular weight distribution ($M_z/M_w$) in the range of less than 3.0; or in the alternative, the linear low density polyethylene composition may have a molecular weight distribution ($M_z/M_w$) in the range of less than 2.8; or in the alternative, the linear low density polyethylene composition may have a molecular weight distribution ($M_z/M_w$) in the range of less than 2.7.

The linear low density polyethylene composition may have a vinyl unsaturation of less than 0.1 vinyls per one thousand carbon atoms present in the linear low density polyethylene composition. All individual values and subranges from less than 0.1 are included herein and disclosed herein; for example, the linear low density polyethylene composition may have a vinyl unsaturation of less than 0.08 vinyls per one thousand carbon atoms present in the linear low density polyethylene composition; or in the alternative, the linear low density polyethylene composition may have a vinyl unsaturation of less than 0.06 vinyls per one thousand carbon atoms present in the linear low density polyethylene composition.

The linear low density polyethylene composition may comprise less than 35 percent by weight of units derived from one or more α-olefin comonomers. All individual values and subranges from less than 35 weight percent are included herein and disclosed herein; for example, the linear low density polyethylene composition may comprise less than 25 percent by weight of units derived from one or more α-olefin comonomers; or in the alternative, the linear low density polyethylene composition may comprise less than 15 percent by weight of units derived from one or more α-olefin comonomers; or in the alternative, the linear low density polyethylene composition may comprise less than 14 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The linear low density polyethylene composition may comprise at least 65 percent by weight of units derived from ethylene. All individual values and subranges from at least 75 weight percent are included herein and disclosed herein; for example, the linear low density polyethylene composition may comprise at least 85 percent by weight of units derived from ethylene; or in the alternative, the linear low density polyethylene composition may comprise less than 100 percent by weight of units derived from ethylene.

The linear low density polyethylene composition may further comprise less than or equal to 100 parts by weight of hafnium residues remaining from the hafnium based metallocene catalyst per one million parts of linear low density polyethylene composition. All individual values and subranges from less than or equal to 100 ppm are included herein and disclosed herein; for example, the linear low density polyethylene composition may further comprise less than or equal to 10 parts by weight of hafnium residues remaining from the hafnium based metallocene catalyst per one million parts of linear low density polyethylene composition; or in the alternative, the linear low density polyethylene composition may further comprise less than or equal to 8 parts by weight of hafnium residues remaining from the hafnium based metallocene catalyst per one million parts of linear low density polyethylene composition; or in the alternative, the linear low density polyethylene composition may further comprise less than or equal to 6 parts by weight of hafnium residues remaining from the hafnium based metallocene catalyst per one million parts of linear low density polyethylene composition; or in the alternative, the linear low density polyethylene composition may further comprise less than or equal to 4 parts by weight of hafnium residues remaining from the hafnium based metallocene catalyst per one million parts of linear low density polyethylene composition; or in the alternative, the linear low density polyethylene composition may further comprise less than or equal to 2 parts by weight of hafnium residues remaining from the hafnium based metallocene catalyst per one million parts of linear low density polyethylene composition; or in the alternative, the linear low density polyethylene composition may further comprise less than or equal to 1.5 parts by weight of hafnium residues remaining from the hafnium based metallocene catalyst per one million parts of linear low density polyethylene composition; or in the alternative, the linear low density polyethylene composition may further comprise less than or equal to 1 parts by weight of hafnium residues remaining from the hafnium based metallocene catalyst per one million parts of linear low density polyethylene composition; or in the alternative, the linear low density polyethylene composition may further comprise less than or equal to 0.75 parts by weight of hafnium residues remaining from the hafnium based metallocene catalyst per one million parts of linear low density polyethylene composition; or in the alternative, the linear low density polyethylene composition may further comprise less than or equal to 0.5 parts by weight of hafnium residues remaining from the hafnium based metallocene catalyst per one million parts of linear low density polyethylene composition the linear low density polyethylene composition may further comprise less than or equal to 0.25 parts by weight of hafnium residues remaining from the hafnium based metallocene catalyst per one million parts of linear low density polyethylene composition. The hafnium residues remaining from the hafnium based metallocene catalyst in the linear low density polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the linear low density polyethylene composition. In one embodiment, the linear low density polyethylene composition has substantially no chromium, zirconium or titanium content, that is, no or only what would be considered by those skilled in the art, trace amounts of these metals are present, such as, for example, less than 0.001 ppm.

The linear low density polyethylene composition has less than 2 peaks on an elution temperature-eluted amount curve determined by Crystallization Elution Fractionation (CEF) method at equal or above 30° C., wherein the purge peak which is below 30° C., is excluded. In the alternative, the linear low density polyethylene composition has only 1 peak or less on an elution temperature-eluted amount curve determined by Crystallization Elution Fractionation (CEF) method at equal or above 30° C., wherein the purge peak which is below 30° C., is excluded. In the alternative, the linear low density polyethylene composition has only 1 peak on an elution temperature-eluted amount curve determined by Crystallization Elution Fractionation (CEF) method at equal or above 30° C., wherein the purge peak which is below 30° C., is excluded. In addition, artifacts generated due to instrumental noise at either side of a peak are not considered to be peaks.

The linear low density polyethylene composition may further comprise additional components such as other polymers and/or additives. Such additives include, but are not limited to, one or more hydrotalcite based neutralizing agents, antistatic agents, color enhancers, dyes, lubricants, fillers, pigments, primary antioxidants, secondary antioxidants, processing aids, UV stabilizers, nucleators, and combinations thereof. The inventive polyethylene composition may contain any amounts of additives. The linear low density polyethylene composition may comprise from about 0 to about 10 percent by the combined weight of such additives, based on the weight of the linear low density polyethylene composition including such additives. All individual values and subranges from about 0 to about 10 weight percent are included herein and disclosed herein; for example, the linear low density polyethylene composition may comprise from 0 to 7 percent by the combined weight of additives, based on the weight of the linear low density polyethylene composition including such additives; in the alternative, the linear low density polyethylene composition may comprise from 0 to 5 percent by the combined weight of additives, based on the weight of the linear low density polyethylene composition including such additives; or in the alternative, the linear low density polyethylene composition may comprise from 0 to 3 percent by the combined weight of additives, based on the weight of the linear low density polyethylene composition including such additives; or in the alternative, the linear low density polyethylene composition may comprise from 0 to 2 percent by the combined weight of additives, based on the weight of the linear low density polyethylene composition including such additives; or in the alternative, the linear low density polyethylene composition may comprise from 0 to 1 percent by the combined weight of additives, based on the weight of the linear low density polyethylene composition including such additives; or in the alternative, the linear low density polyethylene composition may comprise from 0 to 0.5 percent by the combined weight of additives, based on the weight of the linear low density polyethylene composition including such additives.

Any conventional ethylene (co)polymerization reaction may be employed to produce such linear low density polyethylene compositions. Such conventional ethylene (co)polymerization reactions include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, such linear low density polyethylene compositions may be produced in a high pressure reactor via a coordination catalyst system. For example, the linear low density polyethylene composition may be produced via gas phase polymerization process in a single gas phase reactor; however, the production of such linear low density polyethylene compositions is not so limited to gas phase polymerization process, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

In production, a hafnium based metallocene catalyst system including a cocatalyst, as described hereinbelow in further details, ethylene, optionally one or more alpha-olefin comonomers, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atm, preferably 17 to 26 atm. A distributor plate at the bottom of the polymer bed provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the linear low density polyethylene composition is exposed to oxygen. The linear low density polyethylene composition may then be transferred to an extruder to be pelletized. Such pelletization techniques are generally known. The linear low density polyethylene composition may further be melt screened. Subsequent to the melting process in the extruder, the molten composition is passed through one or more active screens, positioned in series of more than one, with each active screen having a micron retention size of from about 2 µm to about 400 µm (2 to $4 \times 10^{-5}$ m), and preferably about 2 µm to about 300 µm (2 to $3 \times 10^{-5}$ m), and most preferably about 2 µm to about 70 µm (2 to $7 \times 10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and optionally one or more α-olefin comonomers, and may also include condensing agents as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not and vice versa. Such deflectors are described in the U.S. Pat. No. 4,933,149 and U.S. Pat. No. 6,627,713.

The hafnium based catalyst system used in the fluidized bed is preferably stored for service in a reservoir under a blanket of a gas, which is inert to the stored material, such as nitrogen or argon. The hafnium based catalyst system may be added to the reaction system, or reactor, at any point and by any suitable means, and is preferably added to the reaction system either directly into the fluidized bed or downstream of the last heat exchanger, i.e. the exchanger farthest downstream relative to the flow, in the recycle line, in which case the activator is fed into the bed or recycle line from a dispenser. The hafnium based catalyst system is injected into the bed at a point above distributor plate. Preferably, the hafnium based catalyst system is injected at a point in the bed where good mixing with polymer particles occurs. Injecting the hafnium based catalyst system at a point above the distribution plate facilitates the operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of linear low density polyethylene composition may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of linear low density polyethylene composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C., or 75° C., or 80° C. to 90° C., or 95° C., or 100° C., or 110° C., or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s).

The above process is suitable for the production of homopolymers comprising ethylene derived units, or copolymers comprising ethylene derived units and at least one or more other α-olefin(s) derived units.

In order to maintain an adequate catalyst productivity in the present invention, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa).

The comonomer, e.g. one or more α-olefin comonomers, if present in the polymerization reactor, is present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas. In one embodiment of the inventive polyethylene composition production, the comonomer is present with ethylene in the cycle gas in a mole ratio range of from 0 to 0.1 (comonomer:ethylene); and from 0 to 0.05 in another embodiment; and from 0 to 0.04 in another embodiment; and from 0 to 0.03 in another embodiment; and from 0 to 0.02 in another embodiment.

Hydrogen gas may also be added to the polymerization reactor(s) to control the final properties (e.g., $I_{21}$ and/or $I_2$) of the inventive polyethylene composition. In one embodiment, the ratio of hydrogen to total ethylene monomer (ppm $H_2$/mol % $C_2$) in the circulating gas stream is in a range of from 0 to 60:1 in one embodiment; from 0.10:1 (0.10) to 50:1 (50) in another embodiment; from 0 to 35:1 (35) in another embodiment; from 0 to 25:1 (25) in another embodiment; from 7:1 (7) to 22:1 (22).

In one embodiment, the process for producing a linear low density polyethylene composition comprises the steps of: (1) (co)polymerizing ethylene and optionally one or more α-olefin comonomer in the presence of a hafnium based metallocene catalyst via a gas phase (co)polymerization process in a single stage reactor; and (2) thereby producing the linear low density polyethylene composition.

The hafnium based catalyst system, as used herein, refers to a catalyst capable of catalyzing the polymerization of ethylene monomers and optionally one or more α-olefin co monomers to produce polyethylene. Furthermore, the hafnium based catalyst system comprises a hafnocene component. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. Preferably, the hafnocene useful in the present invention can be represented by the formula (where "Hf" is hafnium):

$$Cp_nHfX_p \qquad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silylhydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silylhydrocarbon bridging group includes dimethylsilyl (—($CH_3$)$_2$Si—); and an example of a siloxyl-hydrocarbon bridging group includes (—O—($CH_3$)$_2$Si—O—). In one particular embodiment, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals such as F, Cl, Br., hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. More preferably, the hafnocene component useful in the present invention can be represented by the formula:

(2)

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one two three groups selected from the group consisting of methyl, ethyl, propyl, butyl, and isomers thereof.

In one embodiment, the hafnocene based catalyst system is heterogeneous, i.e. the hafnocene based catalyst may further comprise a support material. The support material can be any material known in the art for supporting catalyst compositions; for example an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm.

The hafnocene based catalyst system may further comprise an activator. Any suitable activator known to activate catalyst components towards olefin polymerization may be suitable. In one embodiment, the activator is an alumoxane; in the alternative methalumoxane such as described by J. B. P. Soares and A. E. Hamielec in 3(2) POLYMER REACTION ENGINEERING 131 200 (1995). The alumoxane may preferably be co-supported on the support material in a molar ratio of aluminum to hafnium (Al:Hf) ranging from 80:1 to 200:1, most preferably 90:1 to 140:1.

Such hafnium based catalyst systems are further described in details in the U.S. Pat. No. 6,242,545 and U.S. Pat. No. 7,078,467, incorporated herein by reference.

Additives

The polyethylene blend-composition may further comprise one or more additional additives. Such additives include, but are not limited to, one or more hydrotalcite based neutralizing agents, one or more nucleating agents, one or more antistatic agents, one or more color enhancers, one or more dyes, one or more lubricants, one or more fillers, one or more pigments, one or more primary antioxidants, one or more secondary antioxidants, one or more processing aids, one or more UV stabilizers, and/or combinations thereof. The polyethylene blend-composition may comprise any amounts of such additives. The polyethylene blend-composition may comprise from about 0 to about 10 percent by the combined weight of such additives, based on the total weight of the polyethylene blend composition.

Production

The polyethylene blend-composition is prepared via any conventional melt blending process such as extrusion via an extruder, e.g. single or twin screw extruder. The LDPE, LLDPE, and optionally one or more additives may be melt blended in any order via one or more extruders to form a uniform polyethylene blend-composition.

Applications

The polyethylene blend-composition may be formed into a film via, for example, a blown film process. In one embodiment, when the polyethylene blend-composition is formed into a film via a blown film process, the output rate is improved at least 6 percent relative to a similar linear low density polyethylene; or in the alternative, the total haze is improved by at least 15 percent relative to a blown film consisting essentially of a linear low density polyethylene; or in the alternative, the gloss is improved by at least 10 percent relative to a blown film consisting essentially of a linear low density polyethylene. In one embodiment, the polyethylene blend-composition may be formed into a multi-layer blown film structure. In another embodiment, the polyethylene blend-composition may be formed into a single layer or a multi-layer blown film structure associated with one or more substrates. The blown films prepared according to the present invention may be used as lamination films where the blown polyethylene film is adhesively laminated to a substrate such as biaxially oriented polypropylene (BOPP) films or biaxially oriented polyethylene terephthalate (BOPET) films, liner films, sealant webs, shrink films, stretch films, etc. The blown films according to the present invention have a thickness in the range of from 0.3 to 5 mils, for example, 0.5 to 5 mils.

EXAMPLES

The following examples illustrate the present invention but are not intended to limit the scope of the invention. The examples of the instant invention demonstrate that when the polyethylene blend composition is formed into a film via a blown film process, the output rate is improved at least 6 percent relative to a similar linear low density polyethylene; or in the alternative, the total haze is improved by at least 15 percent relative to a blown film consisting essentially of a linear low density polyethylene; or in the alternative, the gloss is improved by at least 10 percent relative to a blown film consisting essentially of a linear low density polyethylene.

Inventive Composition 1

Inventive Composition 1 is a polyethylene blend composition comprising the melt blending product of (a) 3 percent by weight of a low density polyethylene (LDPE) component having a melt index ($I_2$) of approximately 1.85 g/10 minutes, and a density of 0.919 g/cm³, as further defined in Table 1, provided by The Dow Chemical Company; and (b) 97 percent by weight of a linear low density polyethylene 1 (LLDPE 1) component (including 900 parts of DHT-4A per million parts of the LLDPE 1), which is a linear low density polyethylene (LLDPE) prepared via hafnium based catalyst in a single gas phase reactor, having a melt index ($I_2$) of approximately 0.98 g/10 minutes and a density of approximately 0.917 g/cm³, and further described in Table 1. The properties of the Inventive Composition 1 are measured, and reported in Table 2.

Comparative Composition A

Comparative Composition A is a linear low density polyethylene 1 (LLDPE 1), which is a linear low density polyethylene (LLDPE) prepared via hafnium based catalyst in a single gas phase reactor, having a melt index ($I_2$) of approximately 0.98 g/10 minutes and a density of approximately 0.917 g/cm³. The properties of the Comparative Composition 1 are measured, and reported in Table 2.

Inventive Films 1

Inventive Compositions 1 is formed into Inventive Film 1 via a blown film process based on the process conditions reported in Table 3. Inventive Films 1, a monolayer film, was tested for its properties, and the results are reported in Table 4. The film properties reported in Table 4 are for films made at maximum rate (approximately 14.8 lb/hr/in or 370 lb/hr).

Comparative Films A

Comparative Compositions A is formed into Comparative Film A via a blown film process based on the process conditions reported in Table 3. Comparative Film A, a monolayer films, is tested for its properties, and the results are reported in Table 4. The film properties reported in Table 4 are for films made at maximum rate (approximately 13.9 lb/hr/in or 347 lb/hr).

TABLE 1

|  | Units | LDPE Component | LLDPE 1 Component |
|---|---|---|---|
| Density | g/cm³ | 0.919 | 0.917 |
| $I_2$ | g/10 min | 1.85 | 0.98 |
| $I_{10}/I_2$ |  | 14.3 | 7.9 |
| Viscosity (0.1 rad/s) | Pa·s | 8,863 | 7,976 |
| Viscosity (1.0 rad/s) | Pa·s | 4,639 | 6,936 |
| Viscosity (10 rad/s) | Pa·s | 1,658 | 4,252 |
| Viscosity (100 rad/s) | Pa·s | 464 | 1,630 |
| Tan Delta (0.1 rad/s) |  | 3.1 | 19.6 |
| Melt Strength | cN | 9.2 | 2.8 |
| $M_n$ | g/mol | 11,628 | 33,138 |
| $M_w$ | g/mol | 94,485 | 111,409 |
| $M_z$ | g/mol | 321,061 | 294,112 |
| $M_w/M_n$ |  | 8.13 | 3.36 |
| $T_{m1}$(DSC) | °C. | 109.2 | 120.8 |
| $T_{c1}$(DSC) | °C. | 95.6 | 107.1 |
| $T_{c2}$ (DSC) | °C. |  | 63.3 |
| Heat of fusion | J/g | 136.8 | 134.1 |
| Vinyl Unsaturation | Per 1000 Carbons | — | 0.055 |
| ZSVR |  | — | 1.16 |

TABLE 2

| Polymer Property | Units | Inventive Composition 1 | Comparative Composition A |
|---|---|---|---|
| Density | g/cm³ | 0.921 | 0.917 |
| $I_2$ | g/10 min | 0.921 | 0.98 |
| $I_{10}/I_2$ |  | 8.0 | 7.9 |
| Viscosity (0.1 rad/s) | Pa·s | 8,516 | 7,976 |
| Viscosity (1.0 rad/s) | Pa·s | 6,983 | 6,936 |
| Viscosity (10 rad/s) | Pa·s | 4,060 | 4,252 |
| Viscosity (100 rad/s) | Pa·s | 1,512 | 1,630 |
| Tan Delta (0.1 rad/s) |  | 12.4 | 19.6 |
| Melt Strength | cN | 5.5 | 2.8 |
| $M_n$ | g/mol | 30,790 | 33,138 |
| $M_w$ | g/mol | 109,407 | 111,409 |
| $M_z$ | g/mol | 277,059 | 294,112 |
| $M_w/M_n$ |  | 3.55 | 3.36 |
| $T_{m1}$(DSC) | °C. | 121.6 | 120.8 |
| $T_{c1}$(DSC) | °C. | 109.5 | 107.1 |
| $T_{c2}$ (DSC) | °C. | 67.55 | 63.3 |
| Heat of fusion | J/g | 141.3 | 134.1 |

TABLE 3

| Film Fabrication | Units | Inventive Film 1 | Comparative Film A |
|---|---|---|---|
| Max Output rate | lbs/hr | 370 | 347 |
| Max Output rate | lbs/hr/inch | 14.8 | 13.88 |
| Rate improvement over CE-A | % | 6.6 |  |
| Screw Speed (RPM) | RPM | 48.3 | 44.4 |
| Frost Line Height (FLH-inch) | Inch | 60 | 50 |
| External Air (%) | % | 48 | 45 |
| IBC Exhaust Air (%) | % | 96 | 97 |
| IBC Supply Air (%) | % | 36 | 36.5 |
| % Full load current | % | 4760 | 4790 |
| Horsepower | HP | 5580 | 5680 |
| Barrel P1 (psi) | psi | 5220 | 5200 |
| Barrel P2 (psi) | Psi | 4780 | 4760 |
| Barrel P3 (psi) | Psi | 2520 | 2500 |
| Screen Pressure (psi) | Psi | 370 | 347 |
| Adapter P (psi) | Psi | 14.8 | 13.88 |
| Melt Temp. | °F. | 443 | 442 |
| Temp. Profile (°F.) |  |  |  |
| Barrel T1 | °F. | 350 | 350 |
| Barrel T2 | °F. | 425 | 425 |
| Barrel T3 | °F. | 380 | 380 |
| Barrel T4 | °F. | 325 | 325 |
| Barrel T5 | °F. | 345 | 345 |
| Screen T | °F. | 430 | 430 |
| Adapter T | °F. | 445 | 445 |
| Block T | °F. | 430 | 430 |
| Lower Die T | °F. | 440 | 440 |
| Inner Die T | °F. | 440 | 440 |
| Upper Die T | °F. | 440 | 440 |

TABLE 4

| Film Properties | Units | Inventive Film 1 | Comparative Film A |
|---|---|---|---|
| Film Thickness | mil | 2.0 | 2.0 |
| Dart Impact Resistance-(Method A) | g | 588 | 1200 |
| Tear: Elmendorf-MD | g/mil | 297 | 307 |
| Tear: Elmendorf-CD | g/mil | 485 | 392 |
| Puncture | ft*lbf/in³ | 277 | 250 |
| Total Haze | % | 13.9 | 54 |
| Gloss | % | 51.2 | 12.2 |
| Secant Modulus-CD(1%) | psi | 43763 | 41372 |
| Secant Modulus-CD(2%) | psi | 39574 | 37438 |
| Secant Modulus-MD(1%) | psi | 37438 | 39574 |
| Secant Modulus-MD(2%) | psi | 32151 | 34134 |

Test Methods

Test methods include the following:

Melt Index

Melt indices ($I_2$ and $I_{10}$) were measured in accordance to ASTM D-1238 at 190° C. and at 2.16 kg and 10 kg load, respectively. Their values are reported in g/10 min.

Density

Samples for density measurement were prepared according to ASTM D4703. Measurements were made within one hour of sample pressing using ASTM D792, Method B.

Dynamic Shear Rheology

Samples were compression-molded into 3 mm thick×25 mm diameter circular plaques at 177° C. for 5 minutes under 10 MPa pressure in air. The sample was then taken out of the press and placed on the counter to cool.

Constant temperature frequency sweep measurements were performed on an ARES strain controlled rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method has an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic viscosity ($\eta$*), and tan ($\delta$) or tan delta were calculated.

Melt Strength

Melt strength measurements are conducted on a Gottfert Rheotens 71.97 (Göettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s$^2$; capillary diameter=2.0 mm; capillary length=30 mm; and barrel diameter=12 mm.

DSC Crystallinity Determination

Differential Scanning calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an autosampler module is used to perform the tests. During testing, a nitrogen purge gas flow of 50 ml/minute is used. Each sample is pressed into a thin film and melted in the press at about 175° C.; the melted sample is then air-cooled to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to −40° C. at a 10° C./minute cooling rate and held at −40° C. for 3 minutes. The sample is then heated to 150° C. at 10° C./minute heating rate. The cooling and second heating curves are recorded. The values determined are peak melting temperature ($T_m$), peak crystallization temperature ($T_c$), the heat of fusion ($H_f$), and the % crystallinity for polyethylene samples calculated using the following Equation:

% Crystallinity=[($H_f$ (J/g))/(292 J/g)]×100

The heat of fusion ($H_f$) and the peak melting temperature are reported from the second heat curve. The peak crystallization temperature is determined from the cooling curve.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

$^{13}$C NMR

The samples were prepared by adding approximately 2.7 g of a 50/50 mixture of tetrachloroethane-d$_2$/orthodichlorobenzene containing 0.025 M Cr(AcAc)3 to 0.4 g sample in a Norell 1001-7 10 mm NMR tube, and then purging in a N2 box for 2 hours. The samples were dissolved and homogenized by heating the tube and its contents to 150° C. using a heating block and heat gun. Each sample was visually inspected to ensure homogeneity. The data were collected using a Bruker 400 MHz spectrometer equipped with a Bruker Dual DUL high-temperature CryoProbe. The data were acquired at 57-80 hours per data file, a 7.3 sec pulse repetition delay (6 sec delay+1.3 sec acquisition time), 90 degree flip angles, and inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition. The branch number was calculated from the integral of the peak region at 32.7 ppm and its relative ratio of the peak of neat LDPE.

Crystallization Elution Fractionation (CEF) Method

Comonomer distribution analysis is performed with Crystallization Elution Fractionation (CEF) (PolymerChar in Spain) (B Monrabal et al, Macromol. Symp. 257, 71-79 (2007)). Orthodichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 μm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{(\text{Peak Temperature of NIST 1475a} - \text{Peak Temperature of Hexacontane})}{(\text{Half-height Width of NIST 1475a} - \text{Half-height Width of Hexacontane})}.$$

where the column resolution is 6.0.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC "proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to –2 ppm. The signal from residual $^1$H of TCE is set to 100, the integral $I_{total}$ from –0.5 to 3 ppm is used as the signal from whole polymer in the control experiment. The number of CH$_2$ group, NCH$_2$, in the polymer is calculated as following:

NCH$_2$=I$_{total}$/2

Figure 1:
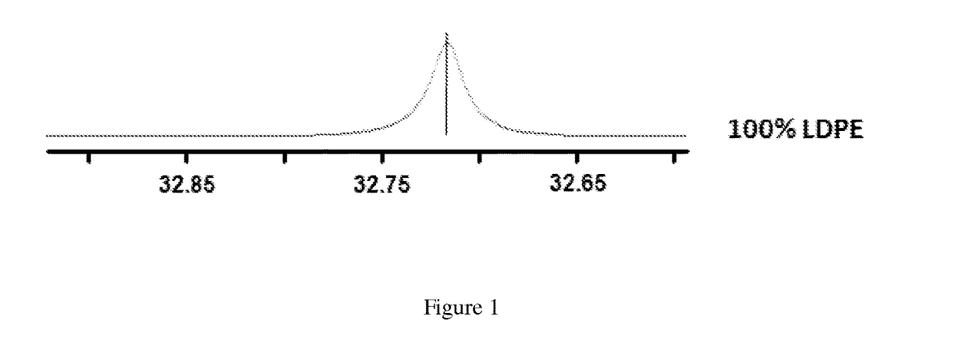
FIG. 1 reports the $^{13}$C NMR spectrum between 32.6 and 32.9 ppm for a low density polyethylene.
Figure 2:
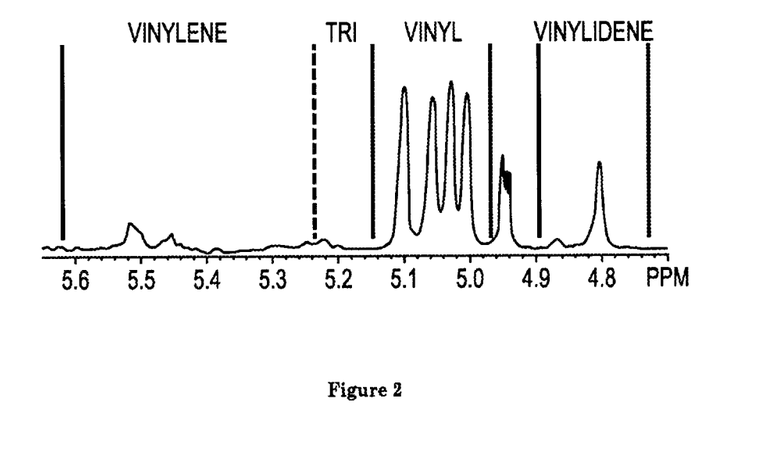
FIG. 2 is the NMR graph referred to in the $^1$H NMR Method described hereinbelow.

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations (I$_{vinylene}$, I$_{trisubstituted}$, I$_{vinyl}$ and I$_{vinylidene}$) were integrated based on the region shown in the graph in FIG. 2.

The number of unsaturation unit for vinylene, trisubstituted, vinyl and vinylidene are calculated:

N$_{vinylene}$=I$_{vinylene}$/2

N$_{trisubstituted}$=I$_{trisubstitute}$

N$_{vinyl}$=I$_{vinyl}$/2

N$_{vinylidene}$=I$_{vinylidene}$/2

The unsaturation unit/1,000,000 carbons is calculated as following:

N$_{vinylene}$/1,000,000C=(N$_{vinylene}$/NCH$_2$)*1,000,000

N$_{trisubstituted}$/1,000,000C=(N$_{trisubstituted}$/NCH$_2$)*1,000,000

N$_{vinyl}$/1,000,000C=(N$_{vinyl}$/NCH$_2$)*1,000,000

N$_{vinylidene}$/1,000,000C=(N$_{vinylidene}$/NCH$_2$)*1,000,000

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown below:

```
;lclprf2_zz
prosol relations=<lcnmr>
#include <Advance, Incl>
"d12=20u"
"d11=tu"
1 ze
d12 pl21:f1
2 30m
d13
d12 pl9:f1
d1 cw:f1 ph29 cw:f2 ph29
d11 do:f1 do:f2
d12 pl11:f1
p1 ph1
go=2 ph31
30m mc #0 to 2 F0(zd)
exit
ph 1=0 2 2 0 1 3 3 1
ph 29=0
ph 31=0 2 2 0 1 3 3 1
```

Film Testing Conditions

The following physical properties are measured on the films produced:

Total Haze: Samples measured for overall haze are sampled and prepared according to ASTM D 1746. A Hazegard Plus (BYK-Gardner USA; Columbia, Md.) is used for testing.

45° Gloss: ASTM D-2457.

1% Secant Modulus—MD (machine direction) and CD (cross direction): ASTM D-882.

MD and CD Elmendorf Tear Strength: ASTM D-1922

Dart Impact Strength: ASTM D-1709, Method A

Puncture Strength: Puncture strength is measured on a Instron Model 4201 with Sintech Testworks Software Version 3.10. The specimen size is 6"×6" and 4 measurements are made to determine an average puncture value. The film is conditioned for 40 hours after film production and at least 24 hours in an ASTM controlled laboratory. A 100 lb load cell is used with a round specimen holder 12.56" square. The puncture probe is a ½" diameter polished stainless steel ball with a 7.5" maximum travel length. There is no gauge length; the probe is as close as possible to, but not touching, the specimen. The crosshead speed used is 10"/minute. The thickness is measured in the middle of the specimen. The thickness of the film, the distance the crosshead traveled, and the peak load are used to determine the puncture by the software. The puncture probe is cleaned using a "Kim-wipe" after each specimen.

Determination of Maximum Output Rate of Blown Film

Film samples are collected at a controlled rate and at a maximum rate. The controlled rate is 250 lb/hr which equals an output rate of 10 lb/hr/inch of die circumference. Note the die diameter used for the maximum output trials is an 8" die so that for the controlled rate, as an example, the conversion between lb/hr and lb/hr/inch of die circumference is shown in Equation 3. Similarly, such an equation can be used for other rates, such as the maximum rate, by substituting the maximum rate in Equation 3 for the standard rate of 250 lb/hr to determine the lb/hr/inch of die circumference.

$$\text{Lb/Hr/Inch of Die Circumference}=(250 \text{ Lb/Hr})/(8*\pi)$$
$$=10 \quad \text{(Eq. 3)}$$

The maximum rate for a given sample is determined by increasing the output rate to the point where bubble stability is the limiting factor. The extruder profile is maintained for both samples (standard rate and maximum rate), however the melt temperature is higher for the maximum rate samples due to the increased shear rate. The maximum rate is determined by maximizing both the internal bubble cooling and the external cooling via the air ring. The maximum bubble stability is determined by taking the bubble to the point where any one of the following things was observed (a) the bubble would not stay seated in the air ring (b) the bubble started to lose its shape (c) the bubble started to breathe in and out or (d) the frost line height would become unstable. At that point the rate is reduced to where the bubble is reseated in the air ring while maintaining the shape of the bubble and a steady frost line height and then a sample is collected. The cooling on the bubble is adjusted by adjusting the air ring and maintaining the bubble. This is taken as the maximum output rate while maintaining bubble stability.

Monolayer films were produced. The die diameter is 8 inches, the die gap is 70 mils, the blow up ratio is 2.5, and internal bubble cooling is used.

The present invention may be embodied in other forms without departing from the spirit and the essential attributes thereof, and, accordingly, reference should be made to the appended claims, rather than to the foregoing specification, as indicating the scope of the invention.

We claim:

1. A polyethylene blend-composition suitable for blown film comprising the melt blending product of:
   from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10;
   from 96 to 99.5 percent or greater by weight of a linear low density polyethylene composition comprising:
      less than or equal to 100 percent by weight of the units derived from ethylene;
      less than 35 percent by weight of units derived from one or more α-olefin comonomers;
   from greater than 0 to 2 percent by weight of a hydrotalcite based neutralizing agent;
      wherein said linear low density polyethylene composition has a density in the range of 0.900 to 0.935 g/cm$^3$, a molecular weight distribution ($M_w/M_n$) in the range of 1.5 to 4.5, a melt index ($I_2$) in the range of 0.1 to 5 g/10 minutes, a molecular weight distribution (Mz/Mw) in the range of less than 3, vinyl unsaturation of less than 0.1 vinyls per one thousand carbon atoms present in the backbone of said composition, and a zero shear viscosity ratio (ZSVR) in the range from 1 to less than 2; and
   optionally one or more nucleating agents;
   and optionally one or more antioxidants.

2. The polyethylene blend-composition suitable for blown film of claim 1, wherein when said polyethylene blend-composition is formed into a film via blown film process, the maximum output rate is improved at least 6 percent relative to the linear low density polyethylene.

3. A blown film comprising the polyethylene blend-composition of claim 1.

4. An article comprising one or more blown films comprising the polyethylene blend-composition of claim 1.

5. A container device comprising:
   (a) one or more substrates; and
   (b) one or more layers comprising one or more blown films comprising the polyethylene blend-composition of claim 1.

6. The polyethylene blend-composition suitable for blown film of claim 1, wherein the polyethylene blend-composition has a peak at 32.7 ppm measured via $^{13}$C NMR, indicating the presence of $C_3$ carbon of $C_5$ branch in the LDPE component.

7. The polyethylene blend-composition suitable for blown film of claim 1, wherein when said polyethylene blend-composition is formed into a film via blown film process, the total haze is improved by at least 15 percent relative to a blown film consisting essentially of a linear low density polyethylene.

8. The polyethylene blend-composition suitable for blown film of claim 1, wherein when said polyethylene blend-composition is formed into a film via blown film process, the gloss is improved by at least 10 percent relative to a blown film consisting essentially of a linear low density polyethylene.

9. The polyethylene blend-composition suitable for blown film of claim 1, wherein said low density polyethylene has a long chain branching of at least 2 per 1000 carbon.

10. The polyethylene blend-composition suitable for blown film of claim 1, wherein the blend composition has a density in the range of 0.903 to 0.950 g/cm$^3$.

11. The polyethylene blend-composition suitable for blown film of claim 1, wherein the blend composition has a low density polyethylene having a molecular weight distribution ($M_w/M_n$) in the range of from 6 to 8.5.

12. The polyethylene blend-composition suitable for blown film of claim 1, wherein the blend composition has a low density polyethylene having a molecular weight distribution ($M_w/M_n$) in the range of from 6 to 8.13.

* * * * *